US009346696B2

(12) United States Patent
Coggin, Jr.

(10) Patent No.: US 9,346,696 B2
(45) Date of Patent: May 24, 2016

(54) GLASS-MELTING FURNACE BURNER AND METHOD OF ITS USE

(75) Inventor: Charles Haley Coggin, Jr., Upland, CA (US)

(73) Assignee: Glass Strand Inc., Hesperia, CA (US)

( * ) Notice: Subject to any disclaimer, the term of this patent is extended or adjusted under 35 U.S.C. 154(b) by 679 days.

(21) Appl. No.: 13/540,011

(22) Filed: Jul. 2, 2012

(65) Prior Publication Data
US 2014/0000316 A1    Jan. 2, 2014

(51) Int. Cl.
| | |
|---|---|
| *C03B 5/00* | (2006.01) |
| *C03B 5/16* | (2006.01) |
| *C03B 3/00* | (2006.01) |
| *C03B 3/02* | (2006.01) |
| *C03B 5/235* | (2006.01) |
| *F23D 14/22* | (2006.01) |
| *F23D 14/32* | (2006.01) |
| *F23M 5/02* | (2006.01) |

(52) U.S. Cl.
CPC .............. *C03B 3/026* (2013.01); *C03B 5/2353* (2013.01); *F23D 14/22* (2013.01); *F23D 14/32* (2013.01); *F23M 5/025* (2013.01); *Y02E 20/344* (2013.01)

(58) Field of Classification Search
CPC ........ C03B 3/026; C03B 5/2353; C03B 5/235
USPC .................. 65/135.9, 136.1, 136.2, 136.3
See application file for complete search history.

(56) References Cited

U.S. PATENT DOCUMENTS

| | | | | |
|---|---|---|---|---|
| 1,805,066 | A | * | 5/1931 | Andrieux ........................ 431/8 |
| 2,838,881 | A | * | 6/1958 | Plumat ........................... 65/142 |
| 3,337,324 | A | * | 8/1967 | Cable, Jr. et al. ............. 65/136.3 |
| 3,341,314 | A | * | 9/1967 | Vukasovich et al. ........... 65/142 |
| 4,054,434 | A |   | 10/1977 | Thomas et al. |
| 4,381,934 | A | * | 5/1983 | Kunkle et al. ................. 65/134.4 |
| 4,422,862 | A |   | 12/1983 | Wardlaw |
| 4,531,960 | A |   | 7/1985 | Desprez |
| 4,539,035 | A | * | 9/1985 | Burckhardt et al. .......... 65/136.1 |
| 4,752,314 | A | * | 6/1988 | Fassbender et al. .......... 65/136.1 |
| 5,129,333 | A | * | 7/1992 | Frederick et al. ............. 110/235 |
| 5,139,558 | A |   | 8/1992 | Lauwers |
| 5,236,484 | A | * | 8/1993 | McNeill ............................ 65/27 |

(Continued)

FOREIGN PATENT DOCUMENTS

| | | |
|---|---|---|
| EP | 1077901 B1 | 9/2004 |
| JP | 2007153676 A * | 6/2007 |

OTHER PUBLICATIONS

English Language Machine Translation of JP 2007-153676 obtained via PAJ on Aug. 18, 2014.*

(Continued)

*Primary Examiner* — Jason L Lazorcik
(74) *Attorney, Agent, or Firm* — Scott A. Felder; Wiley Rein LLP

(57) ABSTRACT

An oxygen-fuel burner for a glass-melting furnace generally includes a first (or inner) conduit for fuel, a second (or middle) conduit for waste glass cullet, and a third (or outer) conduit for combustion oxygen. The first, second, and third conduits are nested and define respective paths for fuel, cullet, and oxygen flows. A cullet supply funnel is coupled to the second conduit such that cullet can be introduced into the second conduit through the funnel. Organic contaminants in the waste glass cullet are incinerated in an almost pure oxygen environment proximate where cullet particles exit from the burner and prior to reaching the glass surface below.

18 Claims, 3 Drawing Sheets

(56) References Cited

U.S. PATENT DOCUMENTS

| | | | |
|---|---|---|---|
| 5,458,483 A | 10/1995 | Taylor | |
| 5,539,181 A | 7/1996 | Sippel | |
| 5,697,306 A * | 12/1997 | LaRue et al. | 110/261 |
| 5,724,901 A | 3/1998 | Guy | |
| 5,829,369 A * | 11/1998 | Sivy et al. | 110/347 |
| 6,237,369 B1 | 5/2001 | LeBlanc et al. | |
| 6,422,041 B1 | 7/2002 | Simpson et al. | |
| 6,519,973 B1 | 2/2003 | Hoke, Jr. et al. | |
| 6,540,508 B1 | 4/2003 | Simpson et al. | |
| 6,684,796 B1 * | 2/2004 | Feldermann | 110/347 |
| 6,705,117 B2 | 3/2004 | Simpson et al. | |
| 6,705,118 B2 | 3/2004 | Simpson et al. | |
| 7,392,668 B2 | 7/2008 | Adams et al. | |
| 7,430,970 B2 * | 10/2008 | LaRue et al. | 110/347 |
| 7,475,569 B2 | 1/2009 | Baker et al. | |
| 7,509,819 B2 | 3/2009 | Baker et al. | |
| 8,051,680 B2 | 11/2011 | Kobayashi | |
| 8,544,298 B2 * | 10/2013 | Sakamoto et al. | 65/135.6 |
| 2005/0138964 A1 * | 6/2005 | Edlinger | 65/28 |
| 2010/0006588 A1 | 1/2010 | Klaiber et al. | |
| 2010/0300153 A1 * | 12/2010 | Zhang et al. | 65/135.9 |
| 2012/0125052 A1 * | 5/2012 | Dong et al. | 65/136.3 |
| 2012/0137736 A1 * | 6/2012 | Sakamoto et al. | 65/66 |
| 2012/0151966 A1 * | 6/2012 | Sakamoto et al. | 65/66 |
| 2012/0159992 A1 * | 6/2012 | Sakamoto et al. | 65/66 |
| 2012/0159994 A1 * | 6/2012 | Sakamoto et al. | 65/136.3 |
| 2012/0167631 A1 * | 7/2012 | Sakamoto | 65/66 |
| 2012/0216571 A1 * | 8/2012 | Sakamoto et al. | 65/66 |

OTHER PUBLICATIONS

"International Search Report & Written Opinion", PCT/US13/48453 (Dec. 6, 2013).

* cited by examiner

GLASS-MELTING FURNACE BURNER AND METHOD OF ITS USE

BACKGROUND OF THE INVENTION a. Field of the Invention

The instant invention relates to glass-melting furnaces. In particular, the instant invention relates to an oxygen-fuel burner that incinerates organic contaminants on waste glass cullet before depositing molten waste glass cullet onto the glass surface below.

b. Background Art

It is known that waste glass cullet results from any glass manufacturing process. This waste glass cullet must either be disposed of in landfills or processed for reintroduction as a raw material.

Waste glass cullet typically includes organic contaminants that would affect the quality of the final glass product if not removed. Reuse of waste glass cullet as a raw material, however, is complicated. In the glass container industry, for example, these organic contaminants are removed by raising the cullet temperature above 650 degrees C. Similarly, the continuous filament glass fiber industry collects and processes waste glass from its processes by grinding and heating the waste above 650 degrees C. Those skilled in the art will appreciate that heating waste glass cullet to at least 650 degrees C. helps ensure that all organic contaminants are incinerated before the waste glass cullet is reused.

Reuse of waste glass cullet as a raw material is also expensive. Indeed, one of the most significant expenses in a glass manufacturing process is the removal of organic materials from waste glass cullet prior to reintroduction as a raw material.

Against this backdrop, raw material costs are rising, production of glass wool for insulation is increasing, and environmental regulations are making landfill disposal less viable.

BRIEF SUMMARY OF THE INVENTION

It is therefore desirable to decrease the complexity and expense associated with the reuse of waste glass cullet in a glass manufacturing process.

An object of the present invention is to provide a burner that allows for less expensive reuse of waste glass cullet.

Another object of the present invention is to provide a burner that allows for a less complex method of reusing waste glass cullet.

A further object of the present invention is to provide an environmentally-friendly and economical method of reusing waste glass cullet.

Yet another object of the present invention is to provide a burner that can be used for glass-melting both with and without reuse of waste glass cullet.

Disclosed herein is a burner that includes: a first conduit having a fuel inlet and a fuel outlet and defining a fuel path between the fuel inlet and the fuel outlet; a second conduit having a cullet inlet and a cullet outlet and defining a cullet path between the cullet inlet and the cullet outlet, wherein the second conduit at least partially surrounds the first conduit; a third conduit having an oxygen inlet and an oxygen outlet and defining an oxygen path between the oxygen inlet and the oxygen outlet, wherein the third conduit at least partially surrounds the second conduit; and a cullet supply funnel having a funnel inlet and a funnel outlet, wherein the funnel outlet is coupled to the cullet inlet such that cullet introduced through the funnel inlet passes through the funnel outlet and into the second conduit. In some embodiments of the invention, one or more of the first conduit, the second conduit, and the third conduit are arranged concentrically. For example, all of the first conduit, the second conduit, and the third conduit can be arranged concentrically.

Optionally, the burner includes a feed control block positioned proximate the funnel outlet. Typically, the feed control block surrounds the first conduit, and a position of the feed control block along the first conduit is adjustable such that a size of a gap between the feed control block and a funnel wall is adjustable. The feed control block can also include a plurality of gas jet ports to help disperse waste glass cullet.

It is also contemplated that the second conduit can include a plurality of ports connecting the cullet path and the oxygen path. In certain embodiments of the invention, these ports are arranged in a spiral pattern so as to induce a spiral flow of waste glass cullet (if any) moving through the second conduit.

In another aspect, the present invention includes a glass furnace that includes: a roof; a floor; a first side wall connecting the roof to the floor; a second side wall connecting the roof to the floor; a first end wall connecting the roof to the floor; a second end wall connecting the roof to the floor; and at least one burner mounted to the roof. In turn, the at least one burner includes: a first conduit having a fuel inlet and a fuel outlet and defining a fuel path between the fuel inlet and the fuel outlet; a second conduit having a cullet inlet and a cullet outlet and defining a cullet path between the cullet inlet and the cullet outlet, wherein the second conduit at least partially surrounds the first conduit; a third conduit having an oxygen inlet and an oxygen outlet and defining an oxygen path between the oxygen inlet and the oxygen outlet, wherein the third conduit at least partially surrounds the second conduit; and a cullet supply funnel having a funnel inlet and a funnel outlet, wherein the funnel outlet is coupled to the cullet inlet such that cullet introduced through the funnel inlet passes through the funnel outlet and into the second conduit.

The glass furnace according to the present invention can also include: a waste glass cullet supply system; a fuel supply coupled to the first conduit; and an oxygen supply coupled to the third conduit. The waste glass cullet supply system will typically include a waste glass cullet feed regulator, such as a vibratory feeder, a rotary valve, or a variable speed screw. It can also include a pneumatic transfer system to transfer waste glass cullet for introduction through the cullet supply funnel.

It is desirable for the at least one burner to be recessed within a corresponding at least one burner block mounted in the roof of the glass furnace. It is also desirable for the at least one burner to be oriented at an angle of between about 0 degrees and about 45 degrees laterally relative to a vertical axis extending from the roof of the glass furnace to the floor of the glass furnace.

Also disclosed herein is a method of producing refined glass from raw glass-forming material in a glass furnace. The method includes the steps of introducing raw glass-forming material into the glass furnace; melting the raw glass-forming material using at least one burner mounted to a roof of the glass furnace; and adding waste glass cullet to the raw glass-forming material by introducing it through the at least one burner. The at least one burner generally includes: a first conduit having a fuel inlet and a fuel outlet and defining a fuel path between the fuel inlet and the fuel outlet; a second conduit having a cullet inlet and a cullet outlet and defining a cullet path between the cullet inlet and the cullet outlet, wherein the second conduit at least partially surrounds the first conduit; a third conduit having an oxygen inlet and an oxygen outlet and defining an oxygen path between the oxygen inlet and the oxygen outlet, wherein the third conduit at least partially surrounds the second conduit; and a cullet supply funnel having a funnel inlet and a funnel outlet, wherein the funnel outlet is coupled to the cullet inlet such that cullet introduced through the funnel inlet passes through the funnel outlet and into the second conduit.

For certain burners, such as those rated at between about 500,000 kcal/hour and 1,250,000 kcal/hour, the step of adding waste glass cullet to the raw glass-forming material by introducing it through the at least one burner can involve feeding waste glass cullet into the at least one burner at a rate of about 2 kg/minute. Of course, other feed rates, generally selected based on the size of the burner, are contemplated. It is also contemplated to regulate a flow of waste glass cullet through the funnel outlet into the second conduit. That is, both the rate at which waste glass cullet enters the cullet supply funnel and the rate at which waste glass cullet exits the cullet supply funnel can be adjusted according to particular applications of the teachings herein. Of course, the burner according to the present invention can also operate without any waste glass cullet being fed therethrough.

An advantage of the present invention is that it reduces the complexity associated with reusing waste glass cullet in glass manufacturing.

Another advantage of the present invention is that it reduces the cost associated with reusing waste glass cullet in glass manufacturing.

Still another advantage of the present invention is that it provides an environmentally-friendly method of reusing waste glass cullet.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
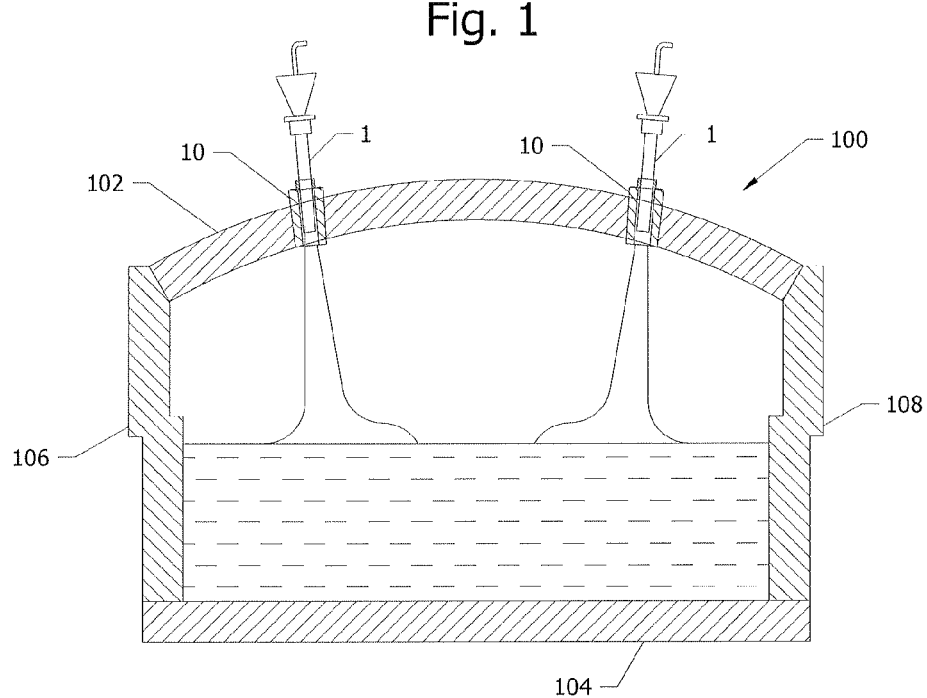
FIG. 1 is a cross-sectional end view of a first glass-melting furnace including two burners according to the present invention.
Figure 2:
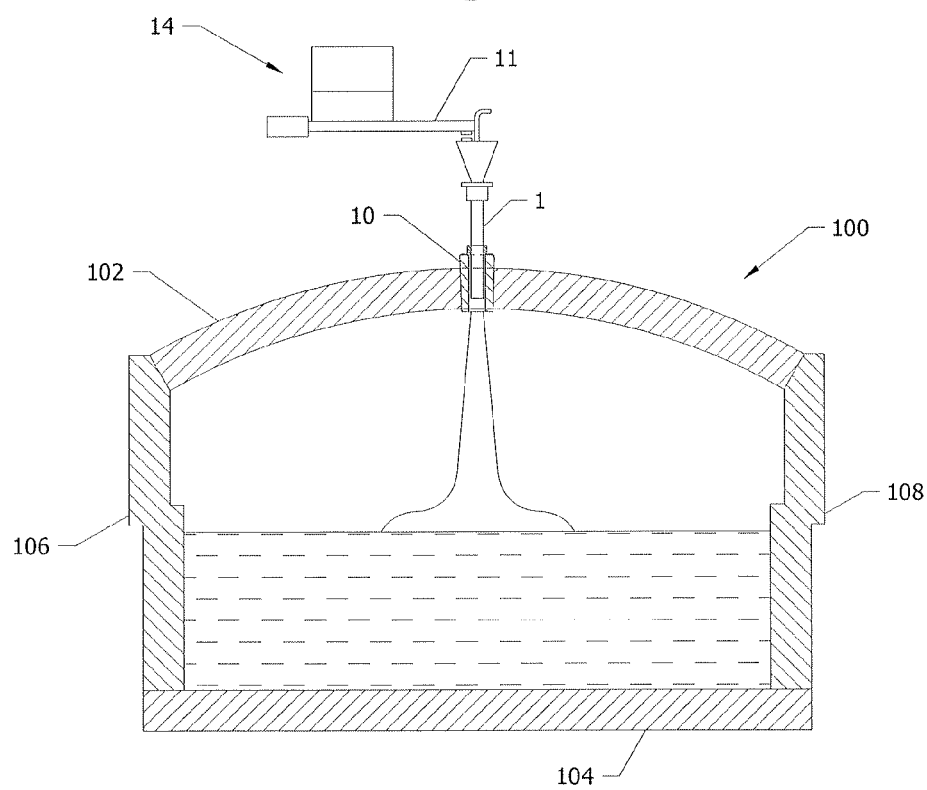
FIG. 2 is a cross-sectional end view of a second glass-melting furnace including one burner according to the present invention.

FIGS. 1 and 2 depict a glass-melting furnace 100. Glass-melting furnace 100 includes a roof 102, a floor 104, a first side wall 106, a second side wall 108, a first end wall (not shown), and a second end wall (not shown). First and second side walls 106, 108 and first and second end walls connect roof 102 to floor 104. Insofar as the details of glass-melting furnaces 100 are conventional and well-known to those of ordinary skill in the art, they will not be further described herein except as necessary to the understanding of the present invention.

FIGS. 1 and 2 also depict burners 1 mounted in roof 102. Typically, burners 1 will be recess-mounted in respective burner blocks 10. Preferably, burners 1 are oriented substantially vertically (see FIG. 1). It is contemplated, however, that they may be angled laterally between about 0 degrees to about 45 degrees relative to a vertical axis that extends from roof 102 to floor 104. FIG. 2 shows this partial angling of burners 1.

Figure 3:
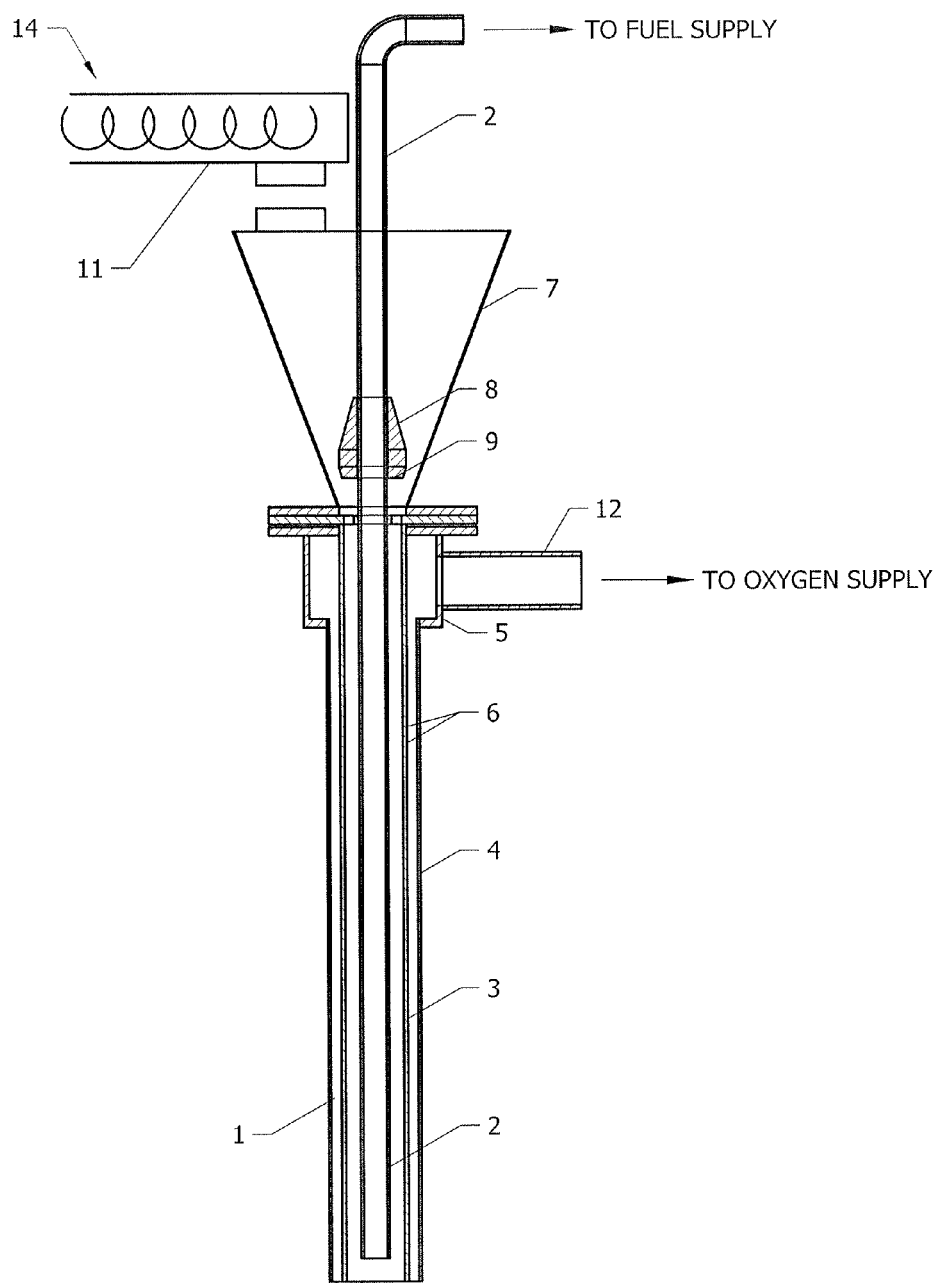
FIG. 3 depicts a burner according to the present invention.
Figure 4:
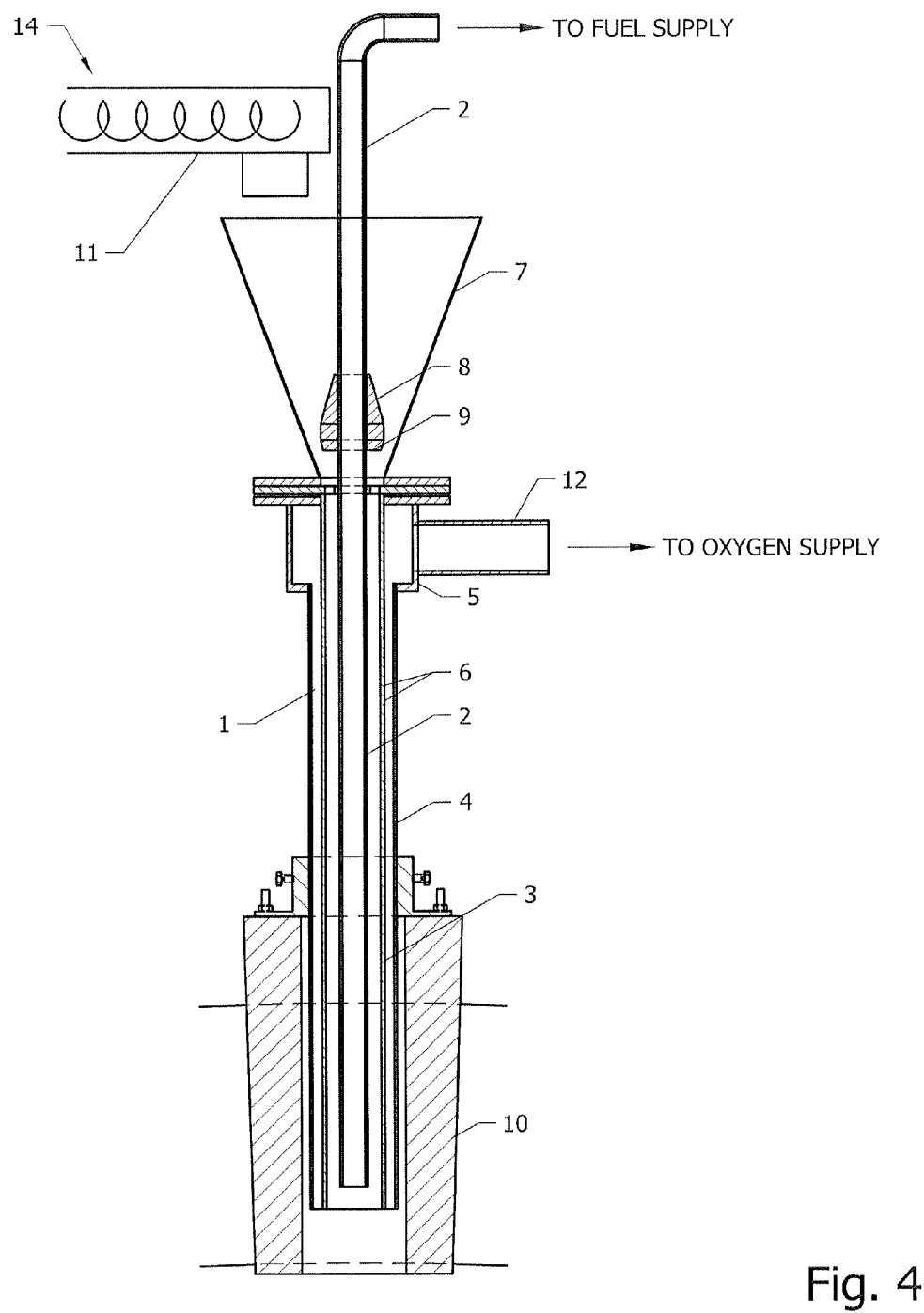
FIG. 4 depicts a burner according to the present invention recessed within a burner block.

Burner 1 is shown in greater detail in FIGS. 3 and 4. As shown in FIGS. 3 and 4, burner 1 generally includes three conduits: a first conduit 2, a second conduit 3, and a third conduit 4. Burner 1 also includes a cullet supply funnel 7.

First, or inner, conduit 2 defines a pathway for a fuel; thus, the inlet and outlet of first conduit 2 are referred to herein as the "fuel inlet" and the "fuel outlet," respectively. The fuel inlet is coupled to a fuel supply.

Second, or middle, conduit 3 defines a pathway for waste glass cullet; thus, the inlet and outlet of second conduit 3 are referred to herein as the "cullet inlet" and the "cullet outlet," respectively. As shown in FIGS. 3 and 4, second conduit 3 at least partially surrounds first conduit 2, such that the pathway for waste glass cullet includes the annular region defined by first and second conduits 2 and 3, respectively. In some embodiments of the invention, the cullet outlet extends beyond the fuel outlet.

Third, or outer, conduit 4 defines a pathway for combustion oxygen; thus, the inlet and outlet of third conduit 4 are referred to herein as the "oxygen inlet" and the "oxygen outlet," respectively. As shown in FIGS. 3 and 4, third conduit 4 at least partially surrounds second conduit 3, such that the pathway for combustion oxygen includes the annular region defined by second and third conduits 3 and 4, respectively. In some embodiments of the invention, the second and third conduits 3 and 4 are co-terminus at their lower ends.

Combustion oxygen enters a chamber 5 from an oxygen gas supply pipe 12, which is coupled to an oxygen supply. Chamber 5 encircles third conduit 3, which helps induce even gas flow down third conduit 3.

It is also contemplated that second conduit 3 may include a plurality of ports 6, such that there are pathways between the cullet path and the oxygen path. Ports 6 provide a gaseous force to help disperse waste glass cullet passing through second conduit 3. Ports 6 are preferably arranged to induce a spiraling flow in the waste glass cullet flowing through second conduit 3. Thus, ports 6 can be arranged in a spiral pattern.

In some embodiments, first, second, and third conduits 2, 3, and 4 are arranged concentrically. It is within the spirit and scope of the invention, however, for one or more of first, second, and third conduits 2, 3, and 4 to be non-concentric.

Cullet supply funnel 7 also includes an inlet and an outlet, referred to herein as the "funnel inlet" and the "funnel outlet," respectively. Cullet supply funnel 7 is coupled to second conduit 3 such that cullet introduced through the funnel passes, under influence of gravity, through the funnel outlet and into second conduit 2.

Cullet supply funnel 7 can also include a feed control block 8 positioned near the funnel outlet. Feed control block 8 is operable to manage the rate at which waste glass cullet passes from cullet supply funnel 7 into second conduit 3. Thus, in some embodiments of the invention, feed control block is adjustably mounted on first conduit 2, permitting variance in the size of the gap between feed control block 8 and the sloped wall of cullet supply funnel 7.

It is also contemplated that feed control block 8 may include one or more gas jets 9 on its lower surface. Jets 9 blow against the cullet inlet and help prevent bridging of waste glass cullet. This is particularly desirable when feeding shredded glass fibers, which may have an aspect ratio of up to 100:1, into second conduit 2. Jets 9 also facilitate a spiraling flow in the waste glass cullet entering second conduit 2. Oxygen can be supplied to gas jets 9 via a needle valve mounted on the oxygen gas supply pipe 12.

FIGS. 3 and 4 also depict a waste glass cullet supply system 14. Waste glass cullet supply system 14 includes a waste glass cullet feed regulator 11, such as a vibratory feeder, a rotary valve, a variable speed screw, or any other suitable mechanism capable of delivering waste glass cullet at a controlled and consistent rate. Waste glass cullet supply system can also include a pneumatic waste glass cullet transfer system. The details of pneumatic transfer systems (e.g., suction systems or pressure systems) are well known and will be understood by those of ordinary skill in the art.

For example, a burner rated at between about 500,000 kcal/hour and 1,250,000 kcal/hour can be fed waste glass cullet at a rate of about 2 kg/minute. At this rate, a single burner 1 can return almost three tons of waste glass cullet to glass-melting furnace 100 per day. Of course, it is within the spirit and scope of the present invention that higher-rated burner could be fed with waste glass cullet at even higher rates.

In use, raw glass-forming material is introduced into glass-melting furnace 100 and melted using at least one burner 1. Waste glass cullet is added to the raw glass-forming material by introducing it through at least one burner 1. For example, pulverized waste glass cullet can be dropped into cullet supply funnel 7, where, under influence of gravity, it descends and enters second conduit 3. The flow of waste glass cullet through second conduit 3 is also aided by the suction imposed on second conduit 3 by the pressurized flows of fuel and oxygen exiting their respective conduits 2 and 4.

It is desirable to control the velocity of the fuel and oxygen to provide a generally laminar gaseous flow that will combust above and impinge on the surface of the glass-forming raw material floating on the glass surface. It is also desirable to create a spiraling flow of gases in order to maintain a tighter column of flame, which helps to prevent molten particles of glass from spreading away from the descending flame column. The spiraling flow (of glass cullet particles and some oxygen) in second conduit 3 is in the form of a cylinder-shaped curtain that separates the oxygen exiting third conduit 4 from the fuel exiting first conduit 2. This separation creates a form of staged combustion and also helps to prevent molten glass from forming on or near the exit surfaces of burner blocks 10.

Because both the fuel supply and the oxygen supply are pressurized, but the cullet supply is not, the oxygen flowing through third conduit 4 will tend to collapse towards second conduit 3, and thus surround the fuel exiting first conduit 2. Thus, as combustion occurs, the cullet particles are heated in an almost pure oxygen environment, such that surface contaminants are rapidly incinerated before the melted glass cullet spreads onto the batch or glass surface below. Moreover, the flow of oxygen through third conduit 4 prevents the cullet particles from spreading outward, while the spiral flow described above aids in keeping the combustion zone tighter, thereby improving combustion.

Although several embodiments of this invention have been described above with a certain degree of particularity, those skilled in the art could make numerous alterations to the disclosed embodiments without departing from the spirit or scope of this invention.

For example, more than one burner 1 can be used in order to increase the amount of waste glass cullet being returned to the glass-melting process.

As another example, because only waste glass cullet is being melted and returned to glass-melting furnace 100, burners 1 can be located anywhere in roof 102 (e.g., over the melting zone and/or over the fining zone).

It should also be understood that the oxygen-fuel burners disclosed and described herein are operable for glass-melting even when waste glass cullet is not being introduced therethrough.

Advantageously, the oxygen-fuel burner according to the present invention does not require that the waste glass cullet be ground to a powder or be completely dry before being introduced into burners 1. This is particularly advantageous with fibrous waste glass collected below winding equipment. Damp waste glass can be shredded while damp, transferred pneumatically to collection hoppers, and then re-transferred by pneumatic vacuum to small feed hoppers located adjacent burners 1, where the shredded fibers will dry in the hot environment above roof 102 of glass-melting furnace 100. Because only first-stage shredding is required, and further drying and size reduction is not required, the present invention reduces processing cost, time, and complexity.

All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A burner, comprising:
   a first conduit having a fuel inlet and a fuel outlet and defining a fuel path between the fuel inlet and the fuel outlet;
   a second conduit having a cullet inlet and a cullet outlet and defining a cullet path between the cullet inlet and the cullet outlet, wherein the second conduit at least partially surrounds the first conduit;
   a third conduit having an oxygen inlet and an oxygen outlet and defining an oxygen path between the oxygen inlet and the oxygen outlet, wherein the third conduit at least partially surrounds the second conduit; and
   a cullet supply funnel having a funnel inlet and a funnel outlet, wherein the funnel outlet is coupled to the cullet inlet such that cullet introduced through the funnel inlet passes through the funnel outlet and into the second conduit,
   wherein the second conduit includes a plurality of ports, arranged in a spiral pattern, connecting the cullet path and the oxygen path.

2. The burner according to claim 1, wherein one or more of the first conduit, the second conduit, and the third conduit are arranged concentrically.

3. The burner according to claim 2, wherein all of the first conduit, the second conduit, and the third conduit are arranged concentrically.

4. The burner according to claim 1, further comprising a feed control block positioned proximate the funnel outlet.

5. The burner according to claim 4, wherein:
   the feed control block surrounds the first conduit; and a position of the feed control block along the first conduit is adjustable such that a size of a gap between the feed control block and a funnel wall is adjustable.

6. The burner according to claim 4, wherein the feed control block comprises a plurality of gas jet ports.

7. A glass furnace, comprising:
a roof;
a floor;
a first side wall connecting the roof to the floor;
a second side wall connecting the roof to the floor;
a first end wall connecting the roof to the floor;
a second end wall connecting the roof to the floor; and
at least one burner mounted to the roof, the at least one burner comprising:
a first conduit having a fuel inlet and a fuel outlet and defining a fuel path between the fuel inlet and the fuel outlet;
a second conduit having a cullet inlet and a cullet outlet and defining a cullet path between the cullet inlet and the cullet outlet, wherein the second conduit at least partially surrounds the first conduit;
a third conduit having an oxygen inlet and an oxygen outlet and defining an oxygen path between the oxygen inlet and the oxygen outlet, wherein the third conduit at least partially surrounds the second conduit; and
a cullet supply funnel having a funnel inlet and a funnel outlet, wherein the funnel outlet is coupled to the cullet inlet such that cullet introduced through the funnel inlet passes through the funnel outlet and into the second conduit,
wherein the second conduit includes a plurality of ports, arranged in a spiral pattern, connecting the cullet path and the oxygen path.

8. The glass furnace according to claim 7, further comprising:
a waste glass cullet supply system;
a fuel supply coupled to the first conduit; and
an oxygen supply coupled to the third conduit.

9. The glass furnace according to claim 8, wherein the waste glass cullet supply system comprises a waste glass cullet feed regulator.

10. The glass furnace according to claim 9, wherein the waste glass cullet feed regulator comprises a vibratory feeder.

11. The glass furnace according to claim 9, wherein the waste glass cullet feed regulator comprises a rotary valve.

12. The glass furnace according to claim 9, wherein the waste glass cullet feed regulator comprises a variable speed screw.

13. The glass furnace according to claim 8, wherein the waste glass cullet supply system comprises a pneumatic waste glass cullet transfer system.

14. The glass furnace according to claim 7, further comprising at least one burner block mounted in the roof of the glass furnace, wherein the at least one burner is recessed within the at least one burner block.

15. The glass furnace according to claim 7, wherein the at least one burner is oriented at an angle of between about 0 degrees and about 45 degrees laterally relative to a vertical axis extending from the roof of the glass furnace to the floor of the glass furnace.

16. A method of producing refined glass from raw glass-forming material in a glass furnace, comprising:
introducing raw glass-forming material into the glass furnace;
melting the raw glass-forming material using at least one burner mounted to a roof of the glass furnace; and
adding waste glass cullet to the raw glass-forming material by introducing it through the at least one burner,
wherein the at least one burner comprises:
a first conduit having a fuel inlet and a fuel outlet and defining a fuel path between the fuel inlet and the fuel outlet;
a second conduit having a cullet inlet and a cullet outlet and defining a cullet path between the cullet inlet and the cullet outlet, wherein the second conduit at least partially surrounds the first conduit;
a third conduit having an oxygen inlet and an oxygen outlet and defining an oxygen path between the oxygen inlet and the oxygen outlet, wherein the third conduit at least partially surrounds the second conduit; and
a cullet supply funnel having a funnel inlet and a funnel outlet, wherein the funnel outlet is coupled to the cullet inlet such that cullet introduced through the funnel inlet passes through the funnel outlet and into the second conduit,
wherein the second conduit includes a plurality of ports, arranged in a spiral pattern, connecting the cullet path and the oxygen path.

17. The method according to claim 16, wherein the step of adding waste glass cullet to the raw glass-forming material by introducing it through the at least one burner comprises feeding waste glass cullet into the at least one burner at a rate of about 2 kg/minute.

18. The method according to claim 16, further comprising regulating a flow of waste glass cullet through the funnel outlet into the second conduit.

* * * * *